(12) United States Patent
Seo et al.

(10) Patent No.: US 8,923,458 B2
(45) Date of Patent: Dec. 30, 2014

(54) METHOD AND DEVICE FOR DECODING IN A DIFFERENTIAL ORTHOGONAL SPACE-TIME BLOCK CODED SYSTEM

(71) Applicant: Industry-Academic Cooperation Foundation, Yonsei University, Seoul (KR)

(72) Inventors: Jong-Soo Seo, Seoul (KR); Jae Shin Han, Seoul (KR); Jong Seob Baek, Jeollanam-do (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 9 days.

(21) Appl. No.: 13/766,910

(22) Filed: Feb. 14, 2013

(65) Prior Publication Data

US 2013/0208833 A1  Aug. 15, 2013

(30) Foreign Application Priority Data

Feb. 14, 2012 (KR) .................. 10-2012-0014704
Jan. 17, 2013 (KR) .................. 10-2013-0005417

(51) Int. Cl.
*H04L 1/02* (2006.01)
*H04L 1/06* (2006.01)
*H04B 7/08* (2006.01)

(52) U.S. Cl.
CPC ............ *H04B 7/0891* (2013.01); *H04L 1/0631* (2013.01); *H04L 1/0668* (2013.01)

USPC ............ 375/347; 375/267; 375/349; 370/203

(58) Field of Classification Search
USPC ......... 375/147, 260, 262, 265, 267, 340, 341, 375/346, 347, 349; 370/203, 204, 208, 210
See application file for complete search history.

(56) References Cited

U.S. PATENT DOCUMENTS

| | | | |
|---|---|---|---|
| 7,649,953 B2 * | 1/2010 | Bauch ........................... | 375/267 |
| 2003/0235147 A1 * | 12/2003 | Walton et al. ................. | 370/204 |
| 2004/0101032 A1 * | 5/2004 | Dabak et al. .................. | 375/143 |
| 2006/0056539 A1 * | 3/2006 | Nam et al. ..................... | 375/299 |
| 2006/0251149 A1 * | 11/2006 | Fujii .............................. | 375/146 |
| 2007/0183527 A1 * | 8/2007 | Jia et al. ........................ | 375/267 |
| 2012/0121002 A1 * | 5/2012 | Liu et al. ....................... | 375/227 |

\* cited by examiner

*Primary Examiner* — Dac Ha
(74) *Attorney, Agent, or Firm* — Edwards Wildman Palmer LLP

(57) ABSTRACT

A method and device for decoding in a differential orthogonal space-time block coded system are disclosed. The disclosed method includes: (a) receiving signals from a transmitter during a particular time slot segment, where the signals are encoded by differential orthogonal space-time block coding; (b) transforming to reception signals for two sub-systems by using a sum operation and a difference operation of the signals received in step (a), where the transformed reception signals for the two sub-systems maintain an orthogonality of an orthogonal space-time block coded system; and (c) performing decoding using the reception signals for the two sub-systems transformed in step (b). The method provides the advantage of lowering the level of operational complexity for decoding in a communication system that employs differential orthogonal space-time block coding.

12 Claims, 3 Drawing Sheets

METHOD AND DEVICE FOR DECODING IN A DIFFERENTIAL ORTHOGONAL SPACE-TIME BLOCK CODED SYSTEM

CROSS-REFERENCE TO RELATED APPLICATIONS

This application claims the benefit of Korean Patent Application No. 10-2012-0014704 and No. 10-2013-0005417, filed on Feb. 14, 2012, and Jan. 17, 2013, respectively, the disclosures of which are incorporated herein by reference in their entirety.

TECHNICAL FIELD

Embodiments of the present invention relate to a method and device for decoding, more particularly to a method and device for decoding in a differential orthogonal space-time block coded system.

BACKGROUND ART

Differential modulation is considered an attractive form of technology, as it obviates the need for a pilot signal at the transmitter, for increased spectrum efficiency, and does not require channel information at the receiver.

Recent studies have developed a technique, known as differential space-time block coding, which applies differential modulation to orthogonal space-time block coding for multi-antennas. In a small terminal, however, it may be difficult to install several antennas, due to size and space constraints. To overcome such difficulties, the distributed diversity (relay diversity) technique has been recently developed.

This involves obtaining diversity gain by processing the signals of the transmitter end and the relay simultaneously. However, much of the research on relays assumes that the channel information is known.

In spite of the research on differential modulation for relays, the research on differential space-time block coding has been limited only to basic space-time block codes, and the research has not much focused on relay systems using differential orthogonal space-time block coding, due to the high level of complexity required at the receiver end.

SUMMARY

An aspect of the invention is to provide a method and device for decoding that use differential orthogonal space-time block coding, in order to resolve the problems of the related art described above.

Another aspect of the invention is to provide a decoding method and device that enable the recovery of a transmission signal with simple operations.

To achieve the objectives above, an aspect of the invention provides a method of decoding in a differential orthogonal space-time block coded system. The method includes: (a) receiving signals from a transmitter during a particular time slot segment, where the signals are encoded by differential orthogonal space-time block coding; (b) transforming to reception signals for two sub-systems by using a sum operation and a difference operation of the signals received in step (a), where the transformed reception signals for the two sub-systems maintain an orthogonality of an orthogonal space-time block coded system; and (c) performing decoding using the reception signals for the two sub-systems transformed in step (b).

Step (b) may include transforming the signals received in step (a) to a matrix form that has elements calculated by selectively adding or subtracting the received signals.

A reception signal ($Y_1^k$) for a first sub-system in step (b) may be transformed using received signals ($y_1, y_2, y_3, y_4$) by the equation shown below:

$$Y_1^k = \begin{bmatrix} y_1^k + y_3^k & y_2^k + y_4^k \\ -(y_2^{k*} + y_4^{k*}) & y_1^{k*} + y_3^{k*} \end{bmatrix}.$$

A reception signal ($Y_2^k$) for a second sub-system in step (b) may be transformed using received signals ($y_1, y_2, y_3, y_4$) by the equation shown below:

$$Y_2^k = \begin{bmatrix} y_1^k - y_3^k & y_2^k - y_4^k \\ -(y_2^{k*} - y_4^{k*}) & y_1^{k*} - y_3^{k*} \end{bmatrix}.$$

At least a part of the transmission signals transmitted by the transmitter may include a signal transformed with a rotated constellation.

If the transmission signals from the transmitter are signals ($x_1, x_2$) transformed with a general constellation, the decoding of step (c) may be performed based on the equation shown below:

$$\hat{X}_{P3,12}^k = \underset{x_1, x_2 \in V_1}{\mathrm{argmin}} \left\| V_1^k - \frac{1}{2}(Y_1^{(k-1)\dagger} Y_1^k + Y_2^{(k-1)\dagger} Y_2^k) \right\|^2 \ldots,$$

where $V_1^k$ is a reference matrix for a transmission signal, $v_1$ is a set of signals transformed with a general constellation, the reference matrix for a transmission signal is defined as follows:

$$V_1^k = \begin{bmatrix} c_1^k & -c_2^{k*} \\ c_2^k & c_1^{k*} \end{bmatrix},$$

and $c_i$ is a reference symbol.

If the transmission signals from the transmitter are signals ($x_3, x_4$) transformed with a rotated constellation, the decoding of step (c) may be performed based on the equation shown below:

$$\hat{X}_{P3,34}^k = \underset{x_3, x_4 \in V_2}{\mathrm{argmin}} \left\| V_2^k - \frac{1}{2}(Y_1^{(k-1)\dagger} Y_1^k - Y_2^{(k-1)\dagger} Y_2^k) \right\|^2,$$

where $V_2^k$ is a reference matrix for a transmission signal, $v_2$ is a set of signals transformed with a rotated constellation, the reference matrix for a transmission signal is defined as follows:

$$V_2^k = \begin{bmatrix} c_3^k & -c_4^{k*} \\ c_4^k & c_3^{k*} \end{bmatrix},$$

and $c_i$ is a reference symbol.

Another aspect of the invention provides a decoding device in a differential orthogonal space-time block coded system. The decoding device includes: a receiving unit configured to receive signals from a transmitter during a particular time slot segment, where the signals are encoded by differential orthogonal space-time block coding; a transforming unit configured to transform to reception signals for two sub-systems by using a sum operation and a difference operation of the signals received by the receiving unit, where the transformed reception signals for the two sub-systems maintain an orthogonality of an orthogonal space-time block coded system; and a decoding unit configured to perform decoding using the reception signals for the two sub-systems transformed by the transforming unit.

Certain embodiments of the invention provide the advantage of lowering the level of operational complexity for decoding in a communication system that employs differential orthogonal space-time block coding.

Additional aspects and advantages of the present invention will be set forth in part in the description which follows, and in part will be obvious from the description, or may be learned by practice of the invention.

DETAILED DESCRIPTION

Figure 1:
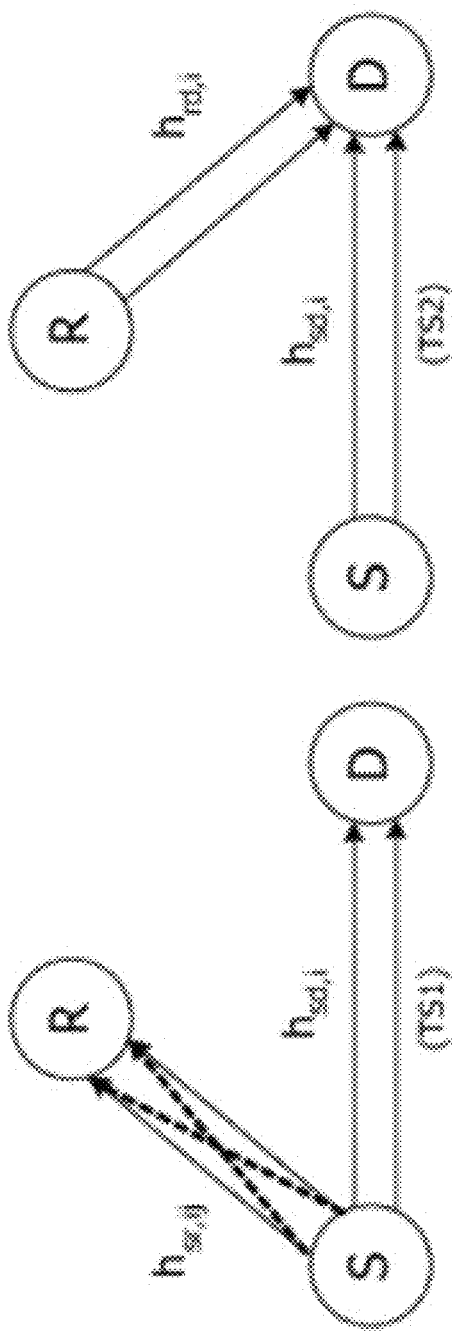
FIG. 1 illustrates an example of a communication system to which an embodiment of the present invention may be applied.

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals are used for like elements.

Figure 2:
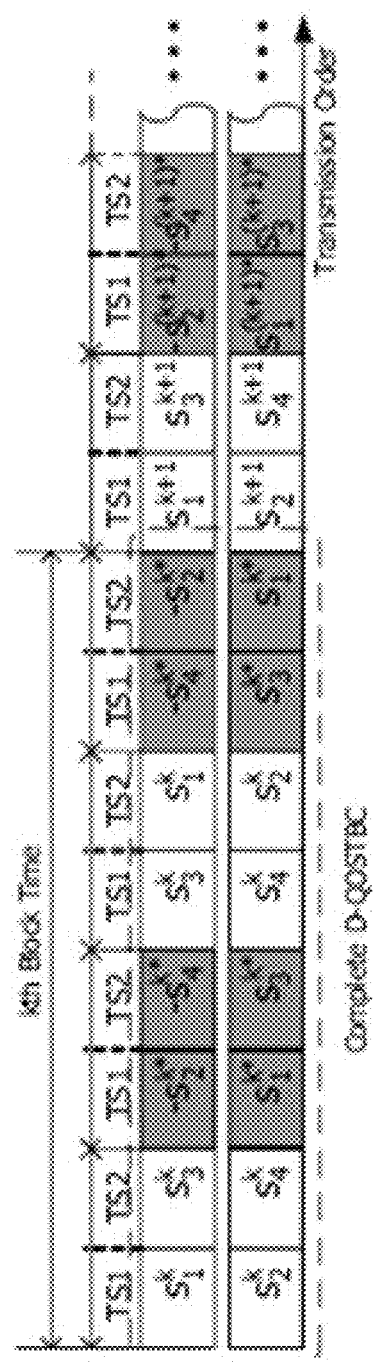
FIG. 2 illustrates the frame structure for a communication system using distributed space-time block coding.

FIG. 1 illustrates an example of a communication system to which an embodiment of the present invention may be applied, and FIG. 2 illustrates the frame structure for a communication system using distributed space-time block coding.

Referring to FIG. 1, a communication system to which an embodiment of the present invention may be applied can include a transmitter S, a relay R, and a receiver D.

In a first time slot TS1, the transmitter S may send signals to the receiver D and the relay R, and in a second time slot TS2, the transmitter S and the relay R may send signals to the receiver D.

Referring to FIG. 2, a block in space-time block coding may be composed of two time slots, and since the process for transmitting all of the blocks is comparable to an extension of the process for transmitting one block, the descriptions that follow will be provided for the case of transmitting the k-th block.

In this embodiment, it is assumed that the channel link has a Rayleigh mean of 0 and a variance of 1.

In FIG. 1, $r_1^k$ and $r_2^k$ received by the relay R in the first time slot can be expressed as Equation 1 below.

$$r_1^k = \sqrt{E_{sr}} h_{sr,11}^k s_1^k + \sqrt{E_{sr}} h_{sr,21}^k s_2^k + n_{R,1}^k$$

$$r_2^k = \sqrt{E_{sr}} h_{sr,12}^k s_1^k + \sqrt{E_{sr}} h_{sr,22}^k s_2^k + n_{R,2}^k \quad \text{[Equation 1]}$$

In Equation 1 above, $E_{sr}$ is the power of the transmitter and the relay, and $h_{sr,ij}^k$ is the channel gain between the i-th transmitter antenna and the j-th receiver antenna. $n_{R,i}^k$ follows a Gaussian distribution with mean 0 and variance $\sigma_{n,R}^2$. The received signals can be normalized as in Equation 2 below.

$$\tilde{r}_1^k = \frac{1}{\eta}\left(\sqrt{E_{sr}} h_{sr,11}^k s_1^k + \sqrt{E_{sr}} h_{sr,21}^k s_2^k + n_{R,1}^k\right) \quad \text{[Equation 2]}$$

$$\tilde{r}_2^k = \frac{1}{\eta}\left(\sqrt{E_{sr}} h_{sr,12}^k s_1^k + \sqrt{E_{sr}} h_{sr,22}^k s_2^k + n_{R,2}^k\right)$$

Here, the constant $\eta = \sqrt{2E_{sr}\sigma_s^2 + \sigma_{n,R}^2}$ satisfies the unit power at the relay, and $\sigma_s^2$ is the symbol variance.

In time slot TS2, the transmitter may send $s_3^k$ and $s_4^k$ to the receiver, and the relay may normalize and then send the received signals The signal obtained by the receiver may be defined as Equation 3 below.

$$y_1^k = \tilde{r}_1^k h_{rd,1}^k + \tilde{r}_2^k h_{rd,2}^k + \sqrt{E_{sd}}(h_{sd,1}^k s_3^k + h_{sd,2}^k s_4^k) + n_{D2}^k \quad \text{[Equation 3]}$$

In Equation 3 above, $E_{sd}$ is the power between the transmitter and the receiver, $h_{sd,i}^k$ is the channel constant between the i-th transmitter antenna and the receiver, and $n_{D2}^k$ is white Gaussian noise.

Consequently, the reception signal of the receiver receiving the signals sent by the relay and transmitter can be expressed as Equation 4 below.

$$y_1^k = \zeta_1^k s_1^k + \zeta_2^k s_2^k + \zeta_3^k s_3^k + \zeta_4^k s_4^k + n_1^k \quad \text{[Equation 4]}$$

In the equation above, $\zeta_i^k$ is used to represent Equation 3 in a simplified form.

Figure 3:
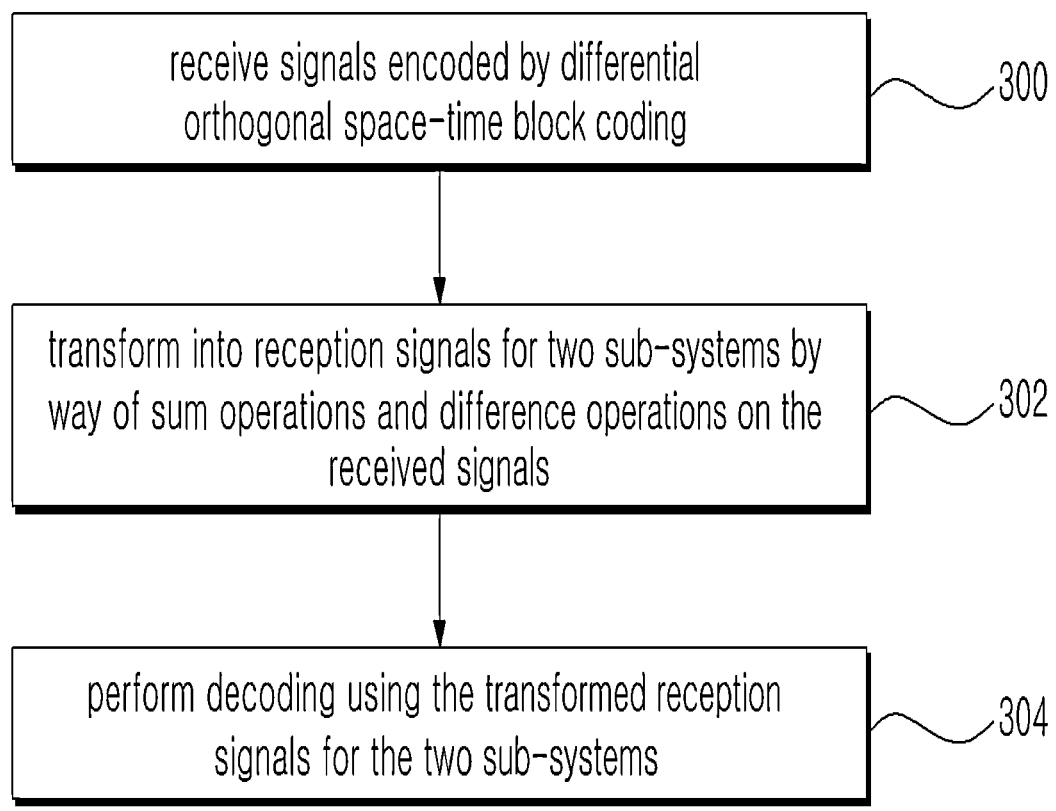
FIG. 3 is a flowchart for a method of decoding in a differential orthogonal time-space block coded system according to an embodiment of the invention.

FIG. 3 is a flowchart for a method of decoding in a differential orthogonal time-space block coded system according to an embodiment of the invention.

Referring to FIG. 3, signals encoded by differential orthogonal space-time block coding may first be received from the transmitter S during a particular time slot segment (step 300). Referring to FIG. 2, the signals can be received for four blocks, during two time slots.

An orthogonal space-time block coding matrix $S^k$ can be used that is as shown in Equation 5 below.

$$S^k = \begin{bmatrix} s_1^k & -s_2^{k*} & s_3^k & -s_4^{k*} \\ s_2^k & s_1^{k*} & s_4^k & s_3^{k*} \\ s_3^k & -s_4^{k*} & s_1^k & -s_2^{k*} \\ s_4^k & s_3^{k*} & s_2^k & s_1^{k*} \end{bmatrix} \quad \text{[Equation 5]}$$

In Equation 5 above, $s_i^k$ is an element of the space-time block coding matrix. The signals received during a particular time slot segment can be expressed by Equation 6 shown below.

$$y_1^k = \zeta_1^k s_1^k + \zeta_2^k s_2^k + \zeta_3^k s_3^k + \zeta_4^k s_4^k + n_1^k$$

$$y_2^k = \zeta_1^k s_2^{k*} + \zeta_2^k s_1^{k*} - \zeta_3^k s_4^{k*} + \zeta_4^k s_3^{k*} + n_2^k$$

$$y_3^k = \zeta_1^k s_3^k + \zeta_2^k s_4^k + \zeta_3^k s_1^k + \zeta_4^k s_2^k + n_3^k$$

$$y_4^k = -\zeta_1^k s_4^{k*} + \zeta_2^k s_3^{k*} - \zeta_3^k s_2^{k*} + \zeta_4^k s_1^{k*} + n_4^k \quad \text{[Equation 6]}$$

When the signals encoded by differential orthogonal space-time block coding are received, the received signals may be transformed into reception signals for two sub-systems by using difference operations and sum operations on the received signals (step 302). The reception signals for the two sub-systems may be transformed in a manner that maintains the properties of the orthogonal space-time block coded system, and thus for the transformed reception signals of the two sub-systems, the channel matrix, space-time block coding matrix, and noise matrix may maintain orthogonality.

The transformed reception signals for the two sub-systems can be expressed as Equation 7 below.

$$Y_1^k = H_1^k S_1^k + N_1^k$$

$$Y_2^k = H_2^k S_2^k + N_2^k \quad \text{[Equation 7]}$$

In Equation 7 above, $Y_1^k$ is the reception signal for a first transformed sub-system, $H_1^k$ is the channel of the first sub-system, $S_1^k$ is the divided space-time block code of the first sub-system, and $N_1^k$ is the noise of the first sub-system.

Also, $Y_2^k$ is the reception signal for a second transformed sub-system, $H_2^k$ is the channel of the second sub-system, $S_2^k$ is the divided space-time block code of the second sub-system, and $N_2^k$ is the noise of the second sub-system.

More specifically, the reception signal for the first sub-system can be transformed from the received signals as in Equation 8 below, and the reception signal for the second sub-system can be transformed from the received signals as in Equation 9 below.

$$Y_1^k = \begin{bmatrix} y_1^k + y_3^k & y_2^k + y_4^k \\ -(y_2^{k*} + y_4^{k*}) & y_1^{k*} + y_3^{k*} \end{bmatrix} \quad \text{[Equation 8]}$$

$$Y_2^k = \begin{bmatrix} y_1^k - y_3^k & y_2^k - y_4^k \\ -(y_2^{k*} - y_4^{k*}) & y_1^{k*} - y_3^{k*} \end{bmatrix} \quad \text{[Equation 9]}$$

The divided space-time block code for the first sub-system can be expressed by Equation 10 below, while the divided space-time block code for the second sub-system can be expressed by Equation 11 below.

$$S_1^k = \begin{bmatrix} s_1^k + s_3^k & -(s_2^{k*} + s_4^{k*}) \\ s_2^k + s_4^k & s_1^{k*} + s_3^{k*} \end{bmatrix} \quad \text{[Equation 10]}$$

$$S_2^k = \begin{bmatrix} s_1^k - s_3^k & -(s_2^{k*} - s_4^{k*}) \\ s_2^k - s_4^k & s_1^{k*} - s_3^{k*} \end{bmatrix} \quad \text{[Equation 11]}$$

Also, the channel matrix and noise matrix of the first sub-system can be expressed by Equation 12 shown below.

$$H_1^k = \begin{bmatrix} \zeta_1^k + \zeta_3^k & \zeta_2^k + \zeta_4^k \\ -(\zeta_2^{k*} + \zeta_4^{k*}) & \zeta_1^{k*} + \zeta_3^{k*} \end{bmatrix} \quad \text{[Equation 12]}$$

$$N_1^k = \begin{bmatrix} n_1^k + n_3^k & n_2^k + n_4^k \\ -(n_2^{k*} + n_4^{k*}) & n_1^{k*} + n_3^{k*} \end{bmatrix}$$

The channel matrix and noise matrix of the second sub-system can be expressed by Equation 13 shown below.

$$H_2^k = \begin{bmatrix} \zeta_1^k - \zeta_3^k & \zeta_2^k - \zeta_4^k \\ -(\zeta_2^{k*} - \zeta_4^{k*}) & \zeta_1^{k*} - \zeta_3^{k*} \end{bmatrix} \quad \text{[Equation 13]}$$

$$N_2^k = \begin{bmatrix} n_1^k - n_3^k & n_2^k - n_4^k \\ -(n_2^{k*} - n_4^{k*}) & n_1^{k*} - n_3^{k*} \end{bmatrix}$$

As described above, the transmission signals encoded at the transmitter end may be signals that are encoded by applying differential modulation, and the transmission signals can include $x_1$, $x_2$, $x_3$, and $x_4$.

In an embodiment of the invention, the transmission signals can be signals that are all transformed with a general constellation, or alternatively, at least a part of the transmission signals can be signals transformed with a rotated constellation. For example, $x_1$ and $x_2$ can be signals transformed with a general constellation, while $x_3$ and $x_4$ can be signals transformed with a rotated constellation.

When the reception signals are transformed for the two sub-systems by way of difference operations and sum operations on the received signals, the decoding for recovering the transmission signals may be performed using the transformed reception signals for the two sub-systems (step 304).

According to an embodiment of the invention, the decoding may be performed using differential decoding based on ML (maximum likelihood). Here, the decoding may be performed to minimize noise in the received signals.

The decoding may be performed using only the transformed reception signals for the two sub-systems, without using channel state information (CSI).

In an embodiment of the invention, it is assumed that the channel state is maintained in continuous block times.

If the transmission signals are signals ($x_1$, $x_2$) transformed with a general constellation, the decoding can be performed based on Equation 14 below.

$$\hat{X}_{P3,12}^k = \underset{x_1, x_2 \in V_1}{\operatorname{argmin}} \left\| V_1^k - \frac{1}{2}\left(Y_1^{(k-1)\dagger} Y_1^k + Y_2^{(k-1)\dagger} Y_2^k\right) \right\|^2 \quad \text{[Equation 14]}$$

In Equation 14 above, $v_1$ represents a set of signals transformed with a general constellation, and $V_1^k$ is a reference matrix for the transmission signals transformed with a general constellation. As can be seen from Equation 14, the decoding can be performed such that the difference between the reference matrix and the particular operation on the transformed reception signals is minimized.

If the transmission signals are all signals that were transformed with a general constellation, the decoding can be performed based on Equation 14.

If a part of the transmission signals are signals ($x_3$, $x_4$) that were transformed with a rotated constellation, the decoding may be performed based on Equation 15 shown below.

$$\hat{X}_{P3,34}^k = \underset{x_3, x_4 \in V_2}{\operatorname{argmin}} \left\| V_2^k - \frac{1}{2}\left(Y_1^{(k-1)\dagger} Y_1^k - Y_2^{(k-1)\dagger} Y_2^k\right) \right\|^2 \quad \text{[Equation 15]}$$

In Equation 15 above, $v_2$ represents a set of signals transformed with a rotated constellation, and $V_2^k$ is a reference matrix for the transmission signals transformed with a rotated constellation. For Equation 15 also, the decoding may be performed such that the difference between the reference matrix and the particular operation on the transformed reception signals is minimized.

The reference matrices $V_1^k$ and $V_2^k$ for the transmission signals can be defined as in Equation 16 below.

$$V_1^k = \begin{bmatrix} c_1^k & -c_2^{k*} \\ c_2^k & c_1^{k*} \end{bmatrix}, V_2^k = \begin{bmatrix} c_3^k & -c_4^{k*} \\ c_4^k & c_3^{k*} \end{bmatrix} \quad \text{[Equation 16]}$$

In Equation 16, $c_i$ represents a reference symbol.

According to an embodiment of the invention, the decoding can utilize the signals transmitted by the relay for decoding imperfect signals from the transmitter for the previous time slot. Here, the decoding can be performed such that the imperfect signals and the perfect reception signals are suitably combined to minimize noise. Here, the imperfect signals and perfect signals can be suitably weighted for the decoding.

By performing the decoding after transforming the received signals into reception signals for two sub-systems that maintain the properties of orthogonal space-time block coding as in an embodiment of the invention, the complexity of the decoding operations can be considerably reduced, and the decoding can be performed with simple sum operations and difference operations on the transformed signals.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. A method of decoding in a differential orthogonal space-time block coded system, the method comprising:
   (a) receiving signals from a transmitter during a particular time slot segment, wherein the signals are encoded by differential orthogonal space-time block coding;
   (b) transforming to reception signals for two sub-systems by using a sum operation and a difference operation of the signals received in said step (a), wherein the transformed reception signals for the two sub-systems maintain an orthogonality of an orthogonal space-time block coded system, wherein said step (b) comprises transforming the signals received in said step (a) to a matrix form having elements calculated by selectively adding or subtracting the received signals; and
   (c) performing decoding using the reception signals for the two sub-systems transformed in said step (b).

2. The method of claim 1, wherein a reception signal ($Y_1^k$) for a first sub-system in said step (b) is transformed using received signals ($y_1, y_2, y_3, y_4$) by an equation shown below:

$$Y_1^k = \begin{bmatrix} y_1^k + y_3^k & y_2^k + y_4^k \\ -(y_2^{k*} + y_4^{k*}) & y_1^{k*} + y_3^{k*} \end{bmatrix}.$$

3. The method of claim 1, wherein a reception signal ($Y_2^k$) for a second sub-system in said step (b) is transformed using received signals ($y_1, y_2, y_3, y_4$) by an equation shown below:

$$Y_2^k = \begin{bmatrix} y_1^k - y_3^k & y_2^k - y_4^k \\ -(y_2^{k*} - y_4^{k*}) & y_1^{k*} - y_3^{k*} \end{bmatrix}.$$

4. The method of claim 1, wherein at least a part of transmission signals transmitted by the transmitter comprises a signal transformed with a rotated constellation.

5. The method of claim 4, wherein, if transmission signals from the transmitter are signals ($x_3, x_4$) transformed with a rotated constellation, the decoding of said step (c) is performed based on an equation shown below:

$$\hat{x}_{P3,34}^k = \underset{x_3, x_4 \in V_2}{\operatorname{argmin}} \left\| V_2^k - \frac{1}{2}\left( Y_1^{(k-1)\dagger} Y_1^k - Y_2^{(k-1)\dagger} Y_2^k \right) \right\|^2,$$

where $V_2^k$ is a reference matrix for a transmission signal, $v_2$ is a set of signals transformed with a rotated constellation, the reference matrix for a transmission signal is defined as follows:

$$V_2^k = \begin{bmatrix} c_3^k & -c_4^{k*} \\ c_4^k & c_3^{k*} \end{bmatrix},$$

and $c_i$ is a reference symbol.

6. The method of claim 1, wherein, if transmission signals from the transmitter are signals ($x_1, x_2$) transformed with a general constellation, the decoding of said step (c) is performed based on an equation shown below:

$$\hat{x}_{P3,12}^k = \underset{x_1, x_2 \in V_1}{\operatorname{argmin}} \left\| V_1^k - \frac{1}{2}\left( Y_1^{(k-1)\dagger} Y_1^k + Y_2^{(k-1)\dagger} Y_2^k \right) \right\|^2,$$

where $V_1^k$ is a reference matrix for a transmission signal, $v_1$ is a set of signals transformed with a general constellation, the reference matrix for a transmission signal is defined as follows:

$$V_1^k = \begin{bmatrix} c_1^k & -c_2^{k*} \\ c_2^k & c_1^{k*} \end{bmatrix},$$

and $c_i$ is a reference symbol.

7. A decoding device in a differential orthogonal space-time block coded system, the decoding device comprising:
   a receiving unit configured to receive signals from a transmitter during a particular time slot segment, wherein the signals are encoded by differential orthogonal space-time block coding;
   a transforming unit configured to transform to reception signals for two sub-systems by using a sum operation and a difference operation of the signals received by the receiving unit, wherein the transformed reception signals for the two sub-systems maintain an orthogonality of an orthogonal space-time block coded system, wherein the transforming unit transforms the signals received by the receiving unit to a matrix form having elements calculated by selectively adding or subtracting the received signals; and a decoding unit configured to perform decoding using the reception signals for the two sub-systems transformed by the transforming unit.

8. The decoding device of claim 7, wherein a reception signal ($Y_1^k$) for a first sub-system at the transforming unit is transformed using received signals ($y_1$, $y_2$, $y_3$, $y_4$) by an equation shown below:

$$Y_1^k = \begin{bmatrix} y_1^k + y_3^k & y_2^k + y_4^k \\ -(y_2^{k*} + y_4^{k*}) & y_1^{k*} + y_3^{k*} \end{bmatrix}.$$

9. The decoding device of claim 7, wherein a reception signal ($Y_2^k$) for a second sub-system at the transforming unit is transformed using received signals ($y_1$, $y_2$, $y_3$, $y_4$) by an equation shown below:

$$Y_2^k = \begin{bmatrix} y_1^k - y_3^k & y_2^k - y_4^k \\ -(y_2^{k*} - y_4^{k*}) & y_1^{k*} - y_3^{k*} \end{bmatrix}.$$

10. The decoding device of claim 7, wherein at least a part of transmission signals transmitted by the transmitter comprises a signal transformed with a rotated constellation.

11. The decoding device of claim 10, wherein, if transmission signals from the transmitter are signals ($x_3$, $x_4$) transformed with a rotated constellation, the decoding unit performs the decoding based on an equation shown below:

$$\hat{X}_{P3,34}^k = \operatorname*{argmin}_{x_3, x_4 \in V_2} \left\| V_2^k - \frac{1}{2}(Y_1^{(k-1)\dagger} Y_1^k - Y_2^{(k-1)\dagger} Y_2^k) \right\|^2,$$

where $V_2^k$ is a reference matrix for a transmission signal, $v_2$ is a set of signals transformed with a rotated constellation, the reference matrix for a transmission signal is defined as follows:

$$V_2^k = \begin{bmatrix} c_3^k & -c_4^{k*} \\ c_4^k & c_3^{k*} \end{bmatrix},$$

and $c_i$ is a reference symbol.

12. The decoding device of claim 7, wherein, if transmission signals from the transmitter are signals ($x_1$, $x_2$) transformed with a general constellation, the decoding unit performs the decoding based on an equation shown below:

$$\hat{X}_{P3,12}^k = \operatorname*{argmin}_{x_1, x_2 \in V_1} \left\| V_1^k - \frac{1}{2}(Y_1^{(k-1)\dagger} Y_1^k + Y_2^{(k-1)\dagger} Y_2^k) \right\|^2,$$

where $V_1^k$ is a reference matrix for a transmission signal, $v_1$ is a set of signals transformed with a general constellation, the reference matrix for a transmission signal is defined as follows:

$$V_1^k = \begin{bmatrix} c_1^k & -c_2^{k*} \\ c_2^k & c_1^{k*} \end{bmatrix},$$

and $c_i$ is a reference symbol.

* * * * *